US011017599B2

(12) United States Patent
Murdock et al.

(10) Patent No.: US 11,017,599 B2
(45) Date of Patent: *May 25, 2021

(54) SYSTEMS AND METHODS TO PROVIDE NARRATIVE EXPERIENCES FOR USERS OF A VIRTUAL SPACE

(71) Applicant: Disney Enterprises, Inc., Burbank, CA (US)

(72) Inventors: Malcolm E. Murdock, Burbank, CA (US); Mohammad Poswal, Burbank, CA (US); Taylor Hellam, Burbank, CA (US); Dario Di Zanni, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/666,889

(22) Filed: Oct. 29, 2019

(65) Prior Publication Data
US 2020/0066039 A1     Feb. 27, 2020

Related U.S. Application Data

(63) Continuation of application No. 15/428,494, filed on Feb. 9, 2017, now Pat. No. 10,467,808.

(51) Int. Cl.
*G06T 19/00*     (2011.01)
*G06F 3/01*     (2006.01)

(52) U.S. Cl.
CPC ............ *G06T 19/003* (2013.01); *G06F 3/011* (2013.01)

(58) Field of Classification Search
CPC ............................. G06T 19/003; G06F 3/011
See application file for complete search history.

(56) References Cited

U.S. PATENT DOCUMENTS

| 8,613,646 | B2 | 12/2013 | Rogers |
| 8,649,803 | B1 | 2/2014 | Hamill |
| 8,880,629 | B1 | 11/2014 | Henrick |
| 9,082,092 | B1 | 7/2015 | Henry |
| 9,165,170 | B1 * | 10/2015 | Gutnik ............... G06K 7/10207 |
| 9,304,652 | B1 | 4/2016 | Lundin |
| 9,392,212 | B1 | 7/2016 | Ross |
| 9,613,179 | B1 | 4/2017 | Schultz |
| 10,185,477 | B1 | 1/2019 | Paley |
| 10,467,808 | B2 | 11/2019 | Murdock |
| 2004/0229685 | A1 | 11/2004 | Smith |
| 2005/0239549 | A1 | 10/2005 | Salvatore |
| 2008/0300053 | A1 * | 12/2008 | Muller .................. G06F 40/166 463/31 |

(Continued)

*Primary Examiner* — Tadesse Hailu
(74) *Attorney, Agent, or Firm* — Esplin & Associates, PC

(57) ABSTRACT

The systems and methods presented herein are related to providing narrative experiences for users of a virtual space. A machine learning based technique may be implemented for generating paths through the virtual space that present the narrative experiences. A path may be based on tagged points of interest, as illustrated in stored narrative information associated with the virtual space. A machine-learning training loop may be applied wherein the system may be trained to recognize and/or understand what sorts of virtual content within the virtual space may be considered to be of narrative interest to audience members.

18 Claims, 3 Drawing Sheets

(56) References Cited

U.S. PATENT DOCUMENTS

| | | |
|---|---|---|
| 2009/0132967 A1* | 5/2009 | Wong .................. G06F 3/04815 |
| | | 715/854 |
| 2010/0161541 A1 | 6/2010 | Covannon |
| 2011/0246182 A1 | 10/2011 | Allen |
| 2011/0314381 A1 | 12/2011 | Fuller |
| 2012/0270615 A1 | 10/2012 | Jones |
| 2012/0309515 A1 | 12/2012 | Chung |
| 2014/0031114 A1 | 1/2014 | Davison |
| 2014/0274403 A1 | 9/2014 | Anastasopoulos |
| 2014/0282013 A1 | 9/2014 | Amijee |
| 2014/0354690 A1 | 12/2014 | Walters |
| 2015/0030305 A1 | 1/2015 | Moon |
| 2016/0293133 A1 | 10/2016 | Dutt |
| 2017/0339089 A1 | 11/2017 | Longdale |

* cited by examiner

SYSTEMS AND METHODS TO PROVIDE NARRATIVE EXPERIENCES FOR USERS OF A VIRTUAL SPACE

FIELD OF THE DISCLOSURE

This disclosure relates to providing narrative experiences for users of a virtual space.

BACKGROUND

Providing interactive narrative content in a virtual space presents complex challenges.

SUMMARY

One aspect of the disclosure relates to a system configured to provide narrative experiences for users of a virtual space. In persistent simulated virtual spaces that are used to generate narrative experiences (e.g., cinematic content and/or other experiences) for end users, it may be necessary to generate paths for AI characters to travel between interesting locations for narrative. Unfortunately, when dealing with automated path generation for procedural (vs. scripted) content, computer-generated paths may often lead to uninteresting locations from a story perspective. For example, just because a character walks behind a building doesn't mean there's anything interesting happening there. Thus, procedural rendering for cloud-based content generation may require a number of unique problems to be solved in order to optimize both the rendering efficiency and the final experience for the user. Character paths must be valid, e.g., obey world physics. Paths should take the character through interesting narrative events without pre-scripting. Paths for cinematic renderings should incorporate visually arresting locations/scenes.

One or more implementations of system 100 presented herein propose solutions for the above problems. The system 100 may implement a machine learning based technique for path generation that considers, among other information, the appeal of environments within a virtual space, and may generates a unique path through the virtual space to present the narrative experience to the user. In some implementations, the path may be based on tagged points of interest, as illustrated in stored narrative information associated with the virtual space. For example, system 100 may store structured metadata (e.g., in the form of narrative information associated with the virtual space) that may associate the world ontology with narrative attributes for generating narrative experiences. A machine-learning training loop may be applied wherein the system may be trained to recognize and/or understand what sorts of virtual content within the virtual space may be considered to be of narrative interest to audience members. This statistical training approach may allow system 100 to automatically generate interesting world paths even in unfamiliar, emergent virtual spaces where virtual space content (e.g., including one or more of characters, objects, and/or events) may not be predefined. This may further allow a responsive generation of AI character actions and/or paths that may respond to user choices. The result may be a system that creates beautiful, cinematic rendered narratives of autonomous characters exploring a world and the events therein, even when such explorations are unscripted and emergent.

In some implementations, the system may include one or more of one or more servers, one or more computing platforms, and/or other components. The one or more servers may include one or more of one or more physical processors, non-transitory electronic storage, and/or other components. The one or more physical processors may be configured by machine-readable instructions. Executing the machine-readable instructions may cause the one or more physical processors to facilitate providing narrative experiences or users of a virtual space. The machine-readable instructions may include one or more of a space component, a user component, an identification component, an experience component, a presentation component, and/or other components.

The non-transitory electronic storage may be configured to store one or more of narrative information, user interaction information, and/or other information. Narrative information may specify values of narrative attributes of the virtual space content. In some implementations, narrative attributes may include one or more of a character role attribute, a plot point attribute, an interaction attribute, an aesthetics attribute, and/or other attributes. User interaction information for an individual user may include identifications and/or indications of virtual space content that the individual user has interacted with.

The space component may be configured to execute one or more instances of a virtual space and implement the one or more instance of the virtual space to facilitate participation of one or more users in the one or more instances of the virtual space. User participation may include interacting with the virtual space content via individual virtual entities associated with individual users.

The user component may be configured to access and/or manage one or more user profiles and/or user information associated with users of the system. For example, the user component may be configured to manage user interaction information. Managing user interaction information may be include tracking user interactions with virtual space content within the virtual space. The user component may be configured to generate the user interaction information based on the tracking of the user interactions within the virtual space.

The identification component may be configured to identify, based on narrative information and/or other information, narrative content within the virtual space. The narrative content may comprise virtual space content that may form bases for narrative experiences to be experienced by one or more users in the virtual space. The narrative content of a narrative experience may include features such as actors (e.g., characters of various roles), a plot, interactions among actors and/or objects, aesthetic scenes, and/or other features in order to tell an intriguing and/or interesting story. By way of non-limiting illustration, narrative information specifying values of narrative attributes of virtual space may indicate whether the virtual space content may be included as part of a narrative experience. For example, if a value of an aesthetics attribute for a particular environment in a virtual space specifies that the particular environment is aesthetically pleasing, then the particular environment may be identified as narrative content that may potentially be included within a narrative experience. As another example, if a value of a character role attribute for a particular non-user entity in the virtual space specifies that the non-user entity may be a primary character (e.g., protagonist), then the non-user entity may be identified as narrative content that may potentially be included within a narrative experience. As yet another example, if a value of an interaction attribute for a particular interaction between non-user entities in the virtual space specifies that the particular interaction may not be of interest in telling a story, the interaction between the non-user entities may be identified as narrative content that may potentially not be included within a narrative experience.

The experience component may be configured to determine, from the identified narrative content, individual sets of the identified narrative content to form individual narrative experiences.

The experience component may define the individual narrative experiences based on individual sets of identified narrative content determined for the individual narrative experiences.

The presentation component may be configured to effectuate presentation of the individual narrative experiences to users of the virtual space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
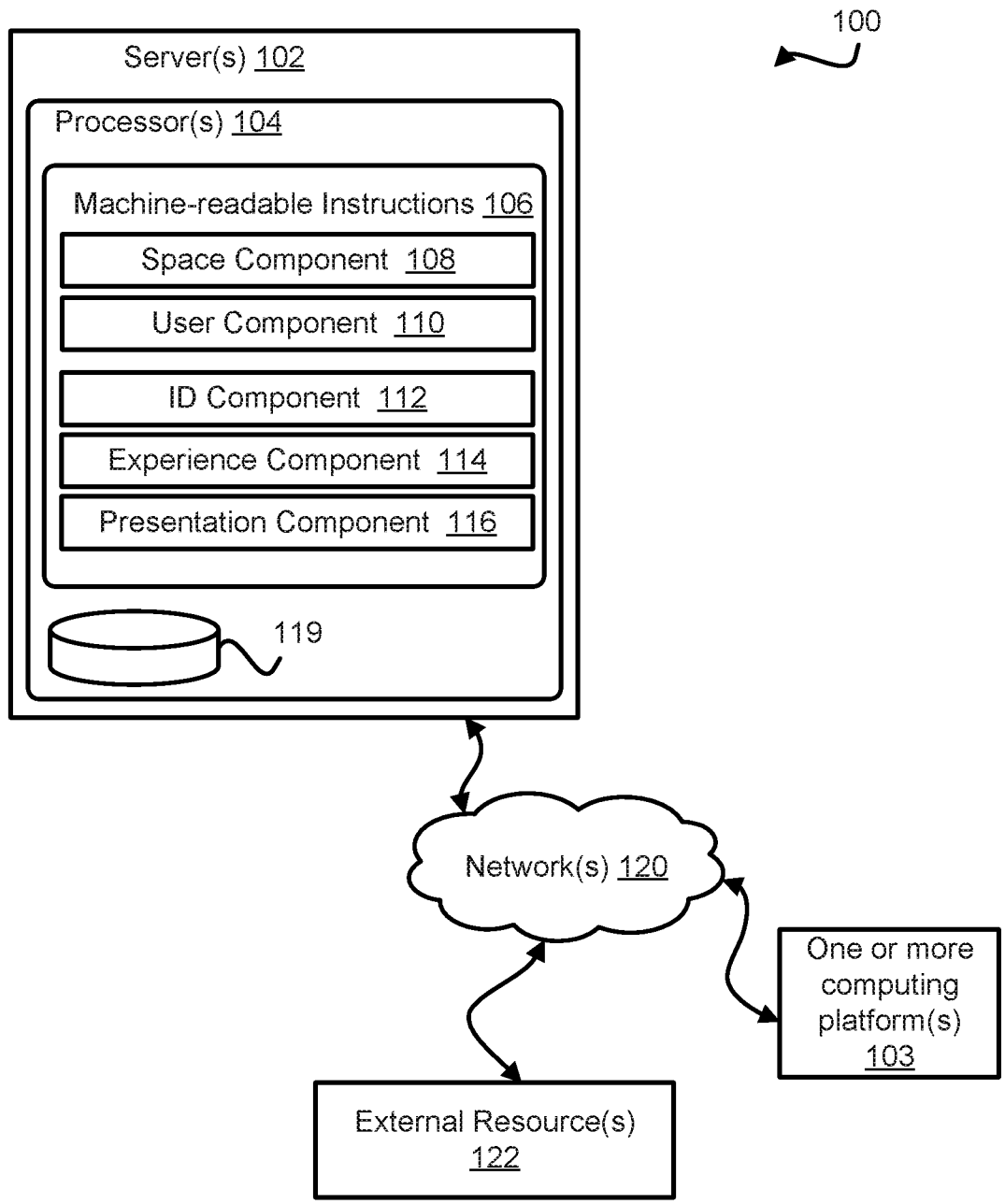
FIG. 1 illustrates a system configured to provide narrative experiences for users of a virtual space, in accordance with one or more implementations.
Figure 2:
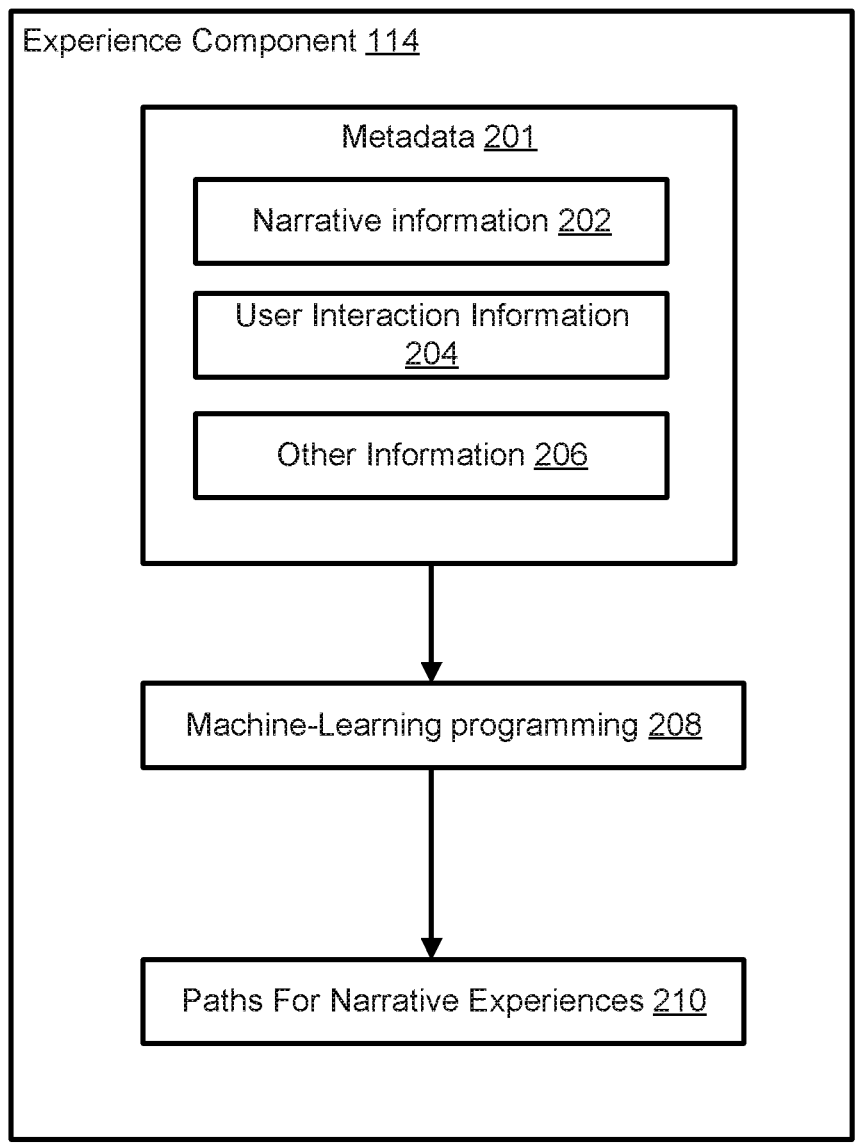
FIG. 2 illustrates an exemplary architecture of a machine learning technique for defining narrative experiences.

FIG. 1 illustrates a system 100 configured to provide narrative experiences for users of a virtual space. In persistent simulated virtual spaces that are used to generate narrative experiences (e.g., cinematic content and/or other experiences) for end users, it may be necessary to generate paths for AI characters to travel between interesting locations for narrative. Unfortunately, when dealing with automated path generation for procedural (vs. scripted) content, computer-generated paths may often lead to uninteresting locations from a story perspective. For example, just because a character walks behind a building doesn't mean there's anything interesting happening there. Thus, procedural rendering for cloud-based content generation may require a number of unique problems to be solved in order to optimize both the rendering efficiency and the final experience for the user. Character paths must be valid, e.g., obey world physics. Paths should take the character through interesting narrative events without pre-scripting. Paths for cinematic renderings should incorporate visually arresting locations/scenes.

One or more implementations of system 100 presented herein propose solutions for the above problems. The system 100 may implement a machine learning based technique for path generation that considers, among other information, the appeal of environments within a virtual space, and may generate a unique path through the virtual space to present the narrative experience to the user. In some implementations, the path may be based on tagged points of interest, as illustrated in stored narrative information associated with the virtual space. For example, system 100 may store structured metadata (e.g., in the form of narrative information associated with the virtual space) that may associate the world ontology with narrative attributes for generating narrative experiences. A machine-learning training loop may be applied wherein the system may be trained to recognize and/or understand what sorts of virtual content within the virtual space may be considered to be of narrative interest to audience members. This statistical training approach may allow system 100 to automatically generate interesting world paths even in unfamiliar, emergent virtual spaces where virtual space content (e.g., including one or more of characters, objects, and/or events) may not be predefined. This may further allow a responsive generation of AI character actions and/or paths that may respond to user choices. The result may be a system that creates beautiful, cinematic rendered narratives of autonomous characters exploring a world and the events therein, even when such explorations are unscripted and emergent.

In some implementations, system 100 may have direct application for the rendering of virtual reality (VR) content, augmented reality (AR) content, mixed reality content, traditional 2D or 3D world content, and/or other content. VR content is suitable for application of one or more features and/or functions of system 100 due to its (typically) 360 degree, "undirected" nature, spherical view.

In some implementations, system 100 may include one or more of one or more servers 102, one or more computing platforms 103, and/or other components. The server(s) 102 may include one or more of electronic storage 119, one or more physical processors 104, and/or other components. The one or more physical processors 104 may be configured by machine-readable instructions 106. Executing the machine-readable instructions 106 may cause the one or more physical processors 104 to facilitate providing narrative experiences for users of a virtual space. The machine-readable instructions 106 may include computer program components. The computer program components may include one or more of a space component 108, a user component 110, an identification component 112 (abbreviated "ID Component 112" in FIG. 1), an experience component 114, a presentation component 116, and/or other components.

In some implementations, one or more servers 102 may be configured to provide remote hosting of the features and/or function of the machine-readable instructions 106 to one or more computing platforms 103 that may be remotely located from one or more servers 102. The one or more servers 102 may communicate with one or more computing platforms 103 via client/server architecture, and/or other communication scheme. In some implementations, one or more features and/or functions of one or more servers 102 may be attributed as local features and/or functions of one or more computing platforms 103. For example, individual computing platforms may obtain machine-readable instructions that may be the same or similar to machine-readable instructions 106 of one or more physical processors 104. The one or more computing platforms 103 may include one or more of a cellular telephone, a smartphone, a laptop, a tablet computer, a desktop computer, a television set-top box, smart TV, a gaming console, and/or other computing platforms.

In FIG. 1, the space component 108 may be configured to implement one or more instances of a virtual space executed by machine-readable instructions 106 to determine views of the virtual space. An instance of the virtual space may present one or more narrative experiences to one or more users. In some implementations where the virtual space may be hosted by server(s) 102, the views may then be communicated (e.g., via streaming, via object/position data, and/or other information) from server(s) 102 to individual ones of computing platform(s) 103 for presentation to users. The view determined and presented to a given user may correspond to one or more of a path traveled by a non-user controlled virtual entity (sometimes referred to as one or more of a non-player character or NPC, a non-user entity, an AI character, and/or other terms), a path of a virtual camera within the virtual space (sometimes referred to as a fly-by camera), a virtual entity being controlled by a given user, and/or other views. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

An instance of a virtual space may include a simulated space that is accessible by one or more users via computing platforms 103 that present the views of the virtual space to the one or more users. The simulated space may have a topography, express ongoing real-time interaction by one or more users, express ongoing real-time interaction by one or more non-user controlled virtual entities, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by machine-readable instructions 106 may be synchronous, asynchronous, and/or semi-synchronous.

The above description of the manner in which views of the virtual space are determined by the virtual space component is not intended to be limiting. The space component 108 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 108, users may control one or more of virtual entities, objects, simulated physical phenomena (e.g., wind, rain, earthquakes, sunrises, sunsets, and/or other phenomena), and/or other elements within the virtual space to interact with the virtual space and/or each other. A virtual entity may refer to a virtual object (or group of objects) present in the virtual space that represents an individual user. For example, a virtual entity may be a virtual character (e.g., an avatar) and/or other virtual objects. A group of virtual entities may include a group of virtual characters, virtual objects, and/or other content. One or more user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual items and/or currency that the user can use (e.g., by manipulation of a virtual entity or other user-controlled element, and/or other items) within the virtual space.

The users may participate in the instance of the virtual space by controlling one or more of the available user controlled elements in the virtual space. Control may be exercised through control inputs and/or commands input by the users through computing platform(s) 103. The users may interact with each other through communications exchanged within the virtual space. Such communications may include one or more of textual chat, instant messages, private messages, voice communications, and/or other communications. Communications may be received and/or entered by the users via their respective computing platform(s). Communications may be routed to and from the appropriate users through server(s) 102.

In some implementations, an instance of a virtual space may be persistent. That is, the instance of the virtual space may continue to exist whether or not any given user (or set of users) may be currently logged in and/or receiving views of the virtual space. In some implementations, a virtual space may be procedurally generated.

A static environment within a virtual space may include an ambient environment in which a narrative experience may take place. An environment may include a simulated space in which virtual objects may be present and/or other virtual object may move about (e.g., non-user entities). By way of non-limiting example, an environment may include one or more of an indoor space (e.g., a building, a vehicle, and/or other indoor space), an outdoor space (e.g., a park, a city block, and/or other outdoor space), and/or other environments. In some implementations, environments may include a particular geographical location (e.g. a particular country, a desert, etc.), a particular time-period (e.g. Wild West, Middle Ages, etc.), and/or other environments, as well as combinations thereof. In some implementations, environments may include one or more objects disposed within the environment. By way of non-limiting example, an environment may include an office building. The office building may be populated with objects.

Simulated physical phenomena may include one or more of wind, rain, earthquakes, cyclical phenomena (e.g., sunrises, sunsets, and/or other phenomena) and/or other phenomena.

Events that take place within the static environments of the virtual space may include one or more interactions of virtual objects (e.g., non-user entities, vehicles, buildings, and/or other virtual objects) within the static environments. By way of non-limiting illustration, interactions between non-user entities and/or between non-user entities and virtual objects may include one or more of walking, talking, fighting, eating, driving, entering (e.g., a building), crashing (e.g., into a non-user entity), and/or other interactions. By way of non-limiting illustration, an event may include a non-user entity getting hit by a car.

The non-transitory electronic storage 119 may be configured to store one or more of narrative information, user interaction information, and/or other information. In some implementations, information stored by electronic storage 119 may be stored as metadata associated with a virtual space, and/or stored in other ways.

Narrative information may specify values of narrative attributes of the virtual space content. In some implementations, narrative attributes may include one or more of a character role attribute, a plot point attribute, an aesthetics attribute, and/or other attributes. The values of the narrative attributes may indicate a manner in which virtual space content may be included within individual narrative experiences. In some implementations, the manner in which virtual space content may be included within individual narrative experiences may include the virtual space content being included within an individual narrative experience or not included within an individual narrative experience. The values of the narrative attributes of virtual space content may be stored as metadata tags of the virtual space content.

A value of a character role attribute may specify a character role that a virtual object (e.g., non-user entity) may have in a narrative experience. By way of non-limiting illustration, a value of a character role attribute for a virtual object (e.g., non-user entity) may include one or more of a primary role (e.g., playing a lead role in a narrative experience), a secondary role (e.g., playing a supporting role in a narrative experience), an ambient role (e.g., playing a background role in a narrative experience), and/or other types of roles. In some implementations, a virtual object may be represented by one or more of a human form (e.g., a human male or female), an animal form (e.g., a dog, a cat, a bear, and/or other animal form), a futuristic form (e.g., a robot, an alien, and/or other futuristic form), and/or other representations, including combinations of multiple forms.

A value of a plot point attribute of virtual space content may specify a plot development role that the virtual space content may have in a narrative experience. By way of non-limiting illustration, a value of a plot point attribute virtual space content may include one or more of a back story, a catalyst, a big event, a midpoint, a crisis, a climax, a realization, and/or other plot points. In some implementations, values of plot point attributes may be specified for one or more of individual virtual objects, individual environments within the virtual space, individual events within the virtual space, and/or other virtual space content. By way of non-limiting illustration, a value of a plot point attribute for an event that includes two non-user entities meeting for the first time may specify that the event may be associated with a backstory. By way of non-limiting illustration, a value of a plot point attribute for a static location may specify that the static location is associated with a big event (e.g., static location may be an intersection and a big event may include an event where a non-user entity may be hit by a car). It is noted that the above examples of values of a plot point attribute is provided for illustrative purpose only and is not to be considered limiting. Instead, one skilled in the art may appreciate various other ways in which virtual space content may provide plot development roles within the narrative of a story.

A value of an aesthetics attribute of virtual space content may specify a measure of visual appeal the virtual space content may have on a viewing user. In some implementations, a value of an aesthetics attribute may be one or more of a quantitative value, a qualitative value, and/or other expression of value. By way of non-limiting illustration, a quantitative value of an aesthetics attribute may comprise a numerical value represented within a value range. For example, a value range may be from 1 to 10 (or other range), where 1 may represent the least amount of visual appeal, 10 may represent the most amount of visual appeal, and values in between may represent varying measures along the scale from 1 to 10. By way of non-limiting illustration, a qualitative value of an aesthetics attribute may comprise a description of visual appeal. for example, description of visual appeal may include one or more of "not visually appealing," "moderately visual appealing," "very visually appealing," and/or other descriptions. By way of non-limiting example, sunset (e.g., a cyclical phenomenon simulated in a virtual space) may have a value of an aesthetics attribute that may specify that the sunset is very visually appealing (e.g., qualitatively via description and/or quantitatively, such as 10/10). By way of non-limiting example, a virtual object such as rectangular building may have a value of an aesthetics attribute that may specify that the virtual object is not visually appealing (e.g., qualitatively via description and/or quantitatively, such as 2/10). It is noted that the above examples of values of an aesthetics attribute are provided for illustrative purpose only and are not to be considered limiting. Instead, one skilled in the art may recognize other ways in which measures of visual appeal may be associated with given virtual space content.

User interaction information for an individual user may include identifications and/or indications of virtual space content that the individual user has interacted with (see, also, user component 110). By way of non-limiting illustration, user interaction information may specify one or more of environments a user has visited and/or viewed, particular non-user entities the user has interacted with (e.g., via a user-controlled virtual entity), events and/or simulated physical phenomena that a user has viewed, virtual objects a user has acquired, and/or other interactions.

The user component 110 may be configured to access and/or manage one or more user profiles and/or user information associated with users of system 100. The one or more user profiles and/or user information may include information stored by one or more servers 102, one or more computing platforms 103, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), information stated by users, purchase information of users, demographic information associated with users, browsing history of users, a computing platform identification associated with a user, a phone number associated with a user, and/or other information related to users. The user component 110 may be configured to generate user interaction information. The user component 110 may generate user interaction information by monitoring user interactions within a virtual space.

The identification component 112 may be configured to identify narrative content within the virtual space. The identification may be based on one or more of narrative information, user interaction information, and/or other information. The narrative content may comprise virtual space content that may form bases for narrative experiences to be experienced by one or more users in the virtual space.

In some implementations, virtual space content may be identified as narrative content forming a basis of a narrative experience based on the individual values of narrative attributes of the virtual space content, and/or other information. In some implementations, virtual space content may be identified as narrative content based on the individual values of narrative attributes meeting and/or exceeding one or more thresholds. In some implementations, an individual threshold may be narrative attribute specific. For example, virtual space content may be identified as narrative content if a value of a first narrative attribute meets or exceeds a first threshold value specific to the first narrative attribute. By way of non-limiting illustration, the first narrative attribute may be an aesthetics attribute, and the first threshold value may be 5/10, and/or other values. By way of further non-limiting illustration, if the virtual space content is a rectangular building, and a value of an aesthetics attribute for the building is 2/10, then the rectangular building may not be identified as narrative content for forming a basis for a narrative experience. By way of further non-limiting illustration, if the virtual space content is a sunset, and a value of an aesthetics attribute for the sunset is 10/10, then an occurrence of the sunset may be identified as narrative content for forming a basis for a narrative experience.

By way of further non-limiting illustration, the first narrative attribute may be a character role attribute, and the first threshold value may be one or both of a primary role and/or secondary role. If the virtual space content comprises a non-user entity having a value of a character role attribute that is "ambient role," the non-user entity may not be identified as narrative content for forming a basis for a narrative experience. If the virtual space content comprises a non-user entity having a value of a character role attribute that is "primary role," the non-user entity may be identified as narrative content for forming a basis for a narrative experience.

In some implementations, virtual space content may be identified as narrative content forming a basis of a narrative experience based on user interaction information, and/or other information. By way of non-limiting illustration, user interaction information may indicate virtual space content that may be of interest to the user and therefore advantageous for inclusion in a narrative experience. For example, user interaction information may indicate that a user often interacts (e.g., measured based on relative comparison to other virtual space content, a certain threshold time and/or amount of interactions, etc.) with a particular non-user entity. The non-user entity may then be identified as narrative content to form the basis of a narrative experience.

In some implementations, identification of virtual space content as narrative content based on user interaction information may be independent of values of narrative attributes. For example, the particular non-user entity may have a value of a character role attribute specifying that they are an ambient role. However, due to the user interest in the non-user entity (e.g., which may become apparent via the user interaction information), the non-user entity may still be identified as narrative content to form a basis for narrative experiences.

By way of further example, user interaction information may indicate that a user may not often interact with a particular non-user entity. The particular non-user entity may have a value of a character role attribute specifying that they are a primary role character. However, due to lack of user interest in the non-user entity (e.g., which may become apparent via the user interaction information), the non-user entity may not be identified as narrative content to form a basis for narrative experiences.

In some implementations, identification of virtual space content as narrative content based on user interaction information may be dependent on values of narrative attributes. User interaction information may indicate that a user may not often interact with a particular non-user entity. The particular non-user entity may have a value of a character role attribute specifying that they are a primary role. Although the user may have limited interest in the non-user entity (e.g., which may become apparent via the user interaction information), the non-user entity may still be identified as narrative content to form a basis for narrative experiences based on the value of the character role attribute.

It is noted that the above examples of identification of narrative content are provided for illustrative purpose only and is not to be considered limiting. Instead, one skilled in the art may appreciate other ways and/or other information that may be used to identify virtual space content as narrative content to form a basis of a narrative experience.

The experience component 114 may be configured to determine, from identified narrative content, individual sets of the identified narrative content to form individual narrative experiences, and/or perform other operations. In some implementations, multiple sets of narrative content may be determined from forming a given narrative experience (see, e.g., discussion of decision points below). Briefly, a given narrative experience may have multiple sets of narrative content, wherein a set of narrative content may correspond to a branch of the narrative experience, and another set of narrative content may correspond to another branch of the narrative experience. In some implementations, a narrative experience may include an individual set of narrative content such that the narrative experience may be linear.

In some implementations, an individual narrative experience may require inclusion of certain virtual space content in order to tell a compelling story narrative. By way of non-limiting illustration, an individual narrative experience may require one or more of a minimum quantity of narrative content, a minimum quantity of narrative content having particular values of narrative attributes, a minimum quantity of narrative content having a minimum amount of past user interaction with the narrative content, and/or other requirements. A set of narrative content may be determined to form an individual narrative experience based on the set of narrative content meeting and/or exceeding the requirements of a narrative experience.

In some implementations, requirements of a narrative experience may be theme-specific. Themes may include one or more of a short-story theme, a dramatic theme, a comedic theme, an epic theme, a soothing theme, and/or other themes. It is noted that the below examples of requirements for different theme narrative experiences is not an exhausted list and is intended to be illustrative only. Those skilled in the art may recognize other requirements and/or combinations of requirements that may be suitable to portray a given theme within a narrative experience.

In some implementations, a short story theme may have a requirement that a determined a set of narrative content to form a narrative experience include at least one item of narrative content. By way of non-limiting illustration, a short story theme narrative experience may have a requirement that narrative content within a set of narrative content in the narrative experience include at least one environment, and/or other requirements.

In some implementations, a dramatic theme may have a requirement that a determined a set of narrative content to form a narrative experience include narrative content having a certain quantity and/or type of values of narrative attributes. By way of non-limiting illustration, a dramatic theme narrative experience may have a requirement that narrative content within a set of narrative content in the narrative experience include one or more of a primary role non-player entity, a secondary role non-player entity, a backstory event, a crisis event, a realization event, a visually appealing environment, and/or other requirements.

In some implementations, a comedic theme may have a requirement that a determined a set of narrative content to form a narrative experience include narrative content having a certain quantity and/or type of values of narrative attributes. By way of non-limiting illustration, a comedic theme narrative experience may have a requirement that narrative content within a set of narrative content in the narrative experience include one or more of a primary role non-player entity, a crisis event, a realization event, a visually unappealing environment, and/or other requirements.

In some implementations, a soothing theme may have a requirement that a determined a set of narrative content to form a narrative experience include narrative content having a certain amount of user interaction associated therewith. By way of non-limiting illustration, a soothing theme narrative experience may have a requirement that narrative content within a set of narrative content in the narrative experience include one or more environments which the user may have visited a particular amount of times.

The experience component 114 may be configured to define individual narrative experiences based on individual sets of identified narrative content determined for the individual narrative experiences.

In some implementations, defining an individual narrative experience may include determining, for individual narrative experiences, individual paths through the virtual space. A path may comprise a frame of reference of a narrative experience. An individual path may be determined such that the narrative content in the individual sets of identified narrative content of the individual narrative experience may be encountered during the individual narrative experience. An individual path may include one or more of a path following a non-player entity, a fly-by camera path, and/or other paths. In some implementations, a path following a non-user entity may be a first person perspective, a third person perspective, and/or other paths. A path may be defined by one or more of a trajectory, a speed, and/or other features. The trajectory of a path may change over time (e.g., may serpentine through a virtual space). The change in trajectory may change a perspective from which the virtual space may be viewed. The speed while traversing a path may be constant, may change over time, and/or may have other features.

An individual paths may include one or more of one or more start points, one or more end points, one or more way points, one or more decision points, and/or other features. A start point may include a location within a virtual space that may begin the story telling of a narrative experience. In some implementations, an end point may include a location within the virtual space where the narrative experience may end. In some implementations, a way point may include a location within a virtual space where a non-user entity and/or a fly-by camera may stop such that a view of the virtual space may be from a (temporarily) fixed perspective and/or fixed location.

In some implementations, a decision point may be included in a path for a narrative experience including multiple sets of narrative content. For example, a narrative experience including a first set of narrative content and a second set of narrative content may branch from the first set of narrative content to a second set of narrative content at a decision point, or continue with the first set of narrative content at the decision point. In some implementations, branching may be based on user input and/or other input. By way of non-limiting illustration, presentation component 116 (described in more detail herein) may be configured to effectuate presentation of a user interface where a user may provide input for branching to other narrative content and/or continuing on a current path of narrative content.

In some implementations, defining an individual narrative experience may include determining, for individual paths, individual ordered sequences for encountering the narrative content included in the individual sets of identified narrative content. In some implementations, an ordered sequence for encountering narrative content in a set of narrative content may be based on a theme of the narrative content and/or other information. In some implementations, an ordered sequence for encountering narrative content in a set of narrative content may be based on conventional ordering within storytelling. For example, ordered sequence of narrative content in a set of narrative content of a narrative experience may follow a plot order. In some implementations, there may be fixed point in a plot where a specific event must and/or will happen for plot progression. Events around the fix points may still vary based on the procedurally generated content. A plot order may include one or more of back story, followed by a catalyst, followed by a big event, followed by a midpoint, followed by a crisis, followed by a climax, followed by a realization, and/or other plot points and/or orders.

In some implementations, defining individual narrative experiences based on individual sets of identified narrative content determined for the individual narrative experiences may further be based on world physics of the virtual space. By way of non-limiting illustration, world physics may dictate that a wall of a building may be impenetrable. Accordingly, a path may be determined such that the path does not violate this aspects of the world physics. World physics may place other restrictions on the definitions of individual narrative experiences and/or paths for narrative experiences.

In some implementations, defining an individual narrative experience may include determining one or more cinematographic effects. Cinematographic effects may include one or more of jump cuts, fade-in, fade-out, side scroll, title screen, closing credits, sound effects, and/or other effects.

In some implementations, defining individual narrative experiences by experience component 114 may be based on one or more machine learning techniques, and/or other techniques. Machine learning techniques may include one or more of a convolutional neural network, decision tree learning, supervised learning, minimax algorithm, unsupervised learning, semi-supervised learning, reinforcements learning, deep learning, artificial neural networks, support vector machine, clustering algorithms, genetic algorithms, random forest, and/or other techniques. In some implementations, a machine learning technique may be initialized by providing exemplars of narrative experiences, as presented herein. The exemplars may be manually created by an administrator of the virtual space and/or by other techniques.

In some implementations, a machine learning technique may be run through a training loop. The training loop of the machine learning technique may take, as inputs, one or more of information defining virtual space content within the virtual space, narrative information, user interaction information, themes, theme requirements, world physics requirements, and/or other information. The machine learning technique may be trained to provide, as outputs, narrative experiences including paths for the narrative experiences, as presented herein. By way of non-limiting illustration in FIG.

2, an exemplary architecture of a machine learning technique is shown. The experience component 114 and/or other components may utilize machine learning programming 208. The machine learning programming 208 may take, as inputs, metadata 201. The metadata 201 may include information stored by electronic storage 119 (FIG. 1), and/or other information. By way of non-limiting illustration, metadata 201 may include one or more of information defining virtual space content within the virtual space, narrative information 202, user interaction information 204, themes, theme requirements, world physics requirements, and/or other information 206. The machine learning programming 208 may provide, as outputs, paths for narrative experiences 210, and/or other information.

Returning to FIG. 1, presentation component 116 may be configured to effectuate presentation of individual narrative experiences to users of the virtual space. Presentation may be effectuated via individual computing platform of one or more computing platforms 103 associated with individual users. In some implementations, effectuating presentation of individual narrative experiences to users of the virtual space may further include effectuating presentation of user interfaces configured to received user input at decision points within a path of an interactive experience.

In to FIG. 1, server(s) 102, computing platform(s) 103, external resources 122, and/or other components may be operatively linked via one or more electronic communication links. For example, such electronic communication links may be established, at least in part, via one or more networks 120 such as the Internet and/or other networks. It will be appreciated that this is not intended to be limiting and that the scope of this disclosure includes implementations in which components may be operatively linked via some other communication media.

External resources 122 may include sources of information, hosts, and/or providers of virtual spaces outside of system 100, external entities participating with system 100, external entities for player-to-player communications, and/or other resources. In some implementations, some or all of the functionality attributed herein to external resources 122 may be provided by resources included in system 100.

Server(s) 102 may include communication lines or ports to enable the exchange of information with a network and/or computing platform(s) 103. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 119 may include electronic storage media that electronically stores information. The electronic storage media of electronic storage 119 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 119 may include one or more virtual storage resources (e.g., cloud storage, a virtual private network, and/or other virtual storage resources). Electronic storage 119 may store software algorithms, information determined by processor(s) 104, information received from computing platform(s) 103, and/or other information that enables system 100 to function as described herein.

Processor(s) 104 may be configured to provide information-processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-116. Processor(s) 104 may be configured to execute components 108-116 by software; hardware; firmware; some combination of software, hardware, and/or firmware; and/or other mechanisms for configuring processing capabilities on processor(s) 104.

It should be appreciated that although components 108-116 are illustrated in FIG. 1 as being co-located within a single processing unit, in implementations in which processor(s) 104 includes multiple processing units, one or more of components 108-116 may be located remotely from the other components. The description of the functionality provided by the different components 108-116 described above is for illustrative purposes and is not intended to be limiting, as any of components 108-116 may provide more or less functionality than is described. For example, one or more of components 108-116 may be eliminated, and some or all of its functionality may be provided by other ones of components 108-116 and/or other components. As another example, processor(s) 104 may be configured to execute one or more additional components that may perform some or all of the functionality attributed to one of components 108-116.

Figure 3:
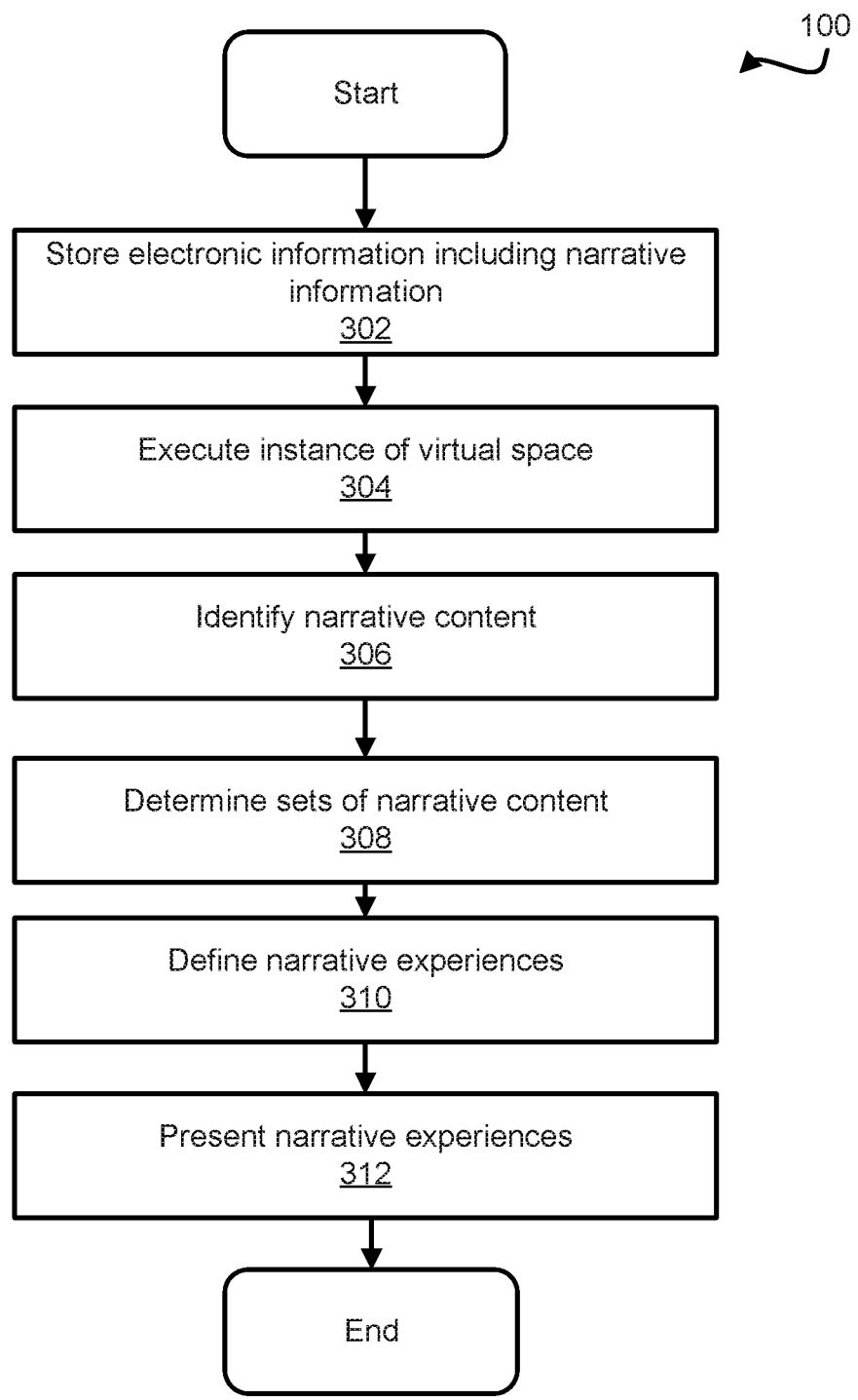
FIG. 3 illustrates a method of providing narrative experiences for users of a virtual space, in accordance with one or more implementations.

FIG. 3 illustrates a method 300 to provide narrative experiences for users of a virtual space, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 300 in response to instructions stored electronically on electronic storage media. The one or more processing devices may include one or more devices configured through hardware, firmware, and/or software to be specifically designed for execution of one or more of the operations of method 300.

At an operation 302, electronic information may be stored. The electronic information may include narrative information associated with the virtual space and/or other information. The virtual space may include virtual space content. The virtual space content may comprise one or more of static environments, virtual objects present within the static environments, one or more events that take place within the static environments, simulated physical phenomena, and/or other content. The narrative information may specify values of narrative attributes of the virtual space content. The narrative attributes may include one or more of a character role attribute, a plot point attribute, an interaction attribute, an aesthetics attribute, and/or other attributes. In some implementations, operation 302 may be performed using non-transitory electronic storage the same or similar to non-transitory electronic storage 119 (shown in FIG. 1 and described herein).

At an operation 304, an instance of the virtual space may be executed. Executing the instance of the virtual space may include implementing the instance of the virtual space to facilitate participation of one or more users in the instance of the virtual space. User participation may include interaction with the virtual space content via individual virtual entities associated with individual users. In some implementations, operation 304 may be performed by a space component the same as or similar to space component 108 (shown in FIG. 1 and described herein).

At an operation 306, narrative content within the virtual space may be identified based on narrative information and/or other information. The narrative content may comprise virtual space content that form bases for narrative experiences to be experienced by one or more users in the virtual space. In some implementations, operation 306 may be performed by an identification component the same as or similar to identification component 110 (shown in FIG. 1 and described herein).

At an operation 308, individual sets of identified narrative content may be determined, from the identified narrative content, to form individual ones of the narrative experiences. In some implementations, operation 308 may be performed by an experience component the same as or similar to experience component 114 (shown in FIG. 1 and described herein).

At an operation 310, individual narrative experiences may be defined based on individual sets of identified narrative content determined for the individual narrative experiences, and/or other information. In some implementations, operation 310 may be performed by an experience component the same as or similar to experience component 114 (shown in FIG. 1 and described herein).

At an operation 312, presentation of the individual narrative experiences to users of the virtual space may be effectuated. In some implementations, operation 312 may be performed by a presentation component the same as or similar to presentation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide narrative experiences for users of a virtual space, the system comprising:
    electronic storage configured to store narrative information associated with a virtual space, the virtual space including virtual space content, the virtual space content comprising one or more static environments, virtual objects present within the one or more static environments, one or more events that take place within the one or more static environments, and simulated physical phenomena, the narrative information specifying values of narrative attributes of the virtual space content, the narrative attributes including one or more of a character role attribute, a plot point attribute, an interaction attribute, or an aesthetics attribute; and
    one or more physical processors configured by machine-readable instructions to:
        determine individual sets of narrative content within the virtual space to form narrative experiences to be experienced by one or more users in the virtual space;
        determine, for individual narrative experiences, individual paths within the virtual space through which the virtual space is viewed during the individual narrative experiences, wherein the individual paths are determined such that the narrative content in the individual sets of narrative content of the individual narrative experiences are encountered without user input during the individual narrative experiences; and
        effectuate presentation of the individual narrative experiences to the one or more users of the virtual space.

2. The system of claim 1, wherein at least some of the narrative content within the virtual space content is emergent when the individual paths are determined.

3. The system of claim 1, wherein the one or more physical processors are further configured by the machine-readable instructions to:
    determine, for the individual paths, individual ordered sequences for encountering the narrative content included in the individual sets of narrative content.

4. The system of claim 3, wherein the individual paths correspond to either fly-by camera views or non-user entity views.

5. The system of claim 1, wherein the one or more physical processors are further configured by machine-readable instructions to:
    obtain user interaction information for individual users of the virtual space, the user interaction information for an individual user including indications of the virtual space content that the individual user has interacted with; and
    wherein the narrative content in the individual sets of narrative content includes the virtual space content that the individual user has interacted with.

6. The system of claim 1, wherein the individual narrative experiences are limited by world physics of the virtual space.

7. The system of claim 1, wherein an individual event includes one or more interactions of one or more of the virtual objects with one or more other ones of the virtual objects within the one or more static environments.

8. The system of claim 1, wherein determining the individual paths is based on machine-learning.

9. The system of claim 1, wherein the virtual space is a persistent procedurally generated virtual space.

10. A method to provide narrative experiences for users of a virtual space, the method comprising:

storing narrative information associated with a virtual space, the virtual space including virtual space content, the virtual space content comprising one or more static environments, virtual objects present within the one or more static environments, one or more events that take place within the one or more static environments, and simulated physical phenomena, the narrative information specifying values of narrative attributes of the virtual space content, the narrative attributes including one or more of a character role attribute, a plot point attribute, an interaction attribute, or an aesthetics attribute;

determining individual sets of narrative content within the virtual space to form narrative experiences to be experienced by one or more users in the virtual space;

determining, for individual narrative experiences, individual paths within the virtual space through which the virtual space is viewed during the individual narrative experiences, including determining the individual paths such that the narrative content in the individual sets of narrative content of the individual narrative experiences are encountered without user input during the individual narrative experiences; and effectuating presentation of the individual narrative experiences to the one or more users of the virtual space.

11. The method of claim 10, wherein at least some of the narrative content within the virtual space content is emergent when the individual paths are determined.

12. The method of claim 10, further comprising:
determining, for the individual paths, individual ordered sequences for encountering the narrative content included in the individual sets of narrative content.

13. The method of claim 12, wherein the individual paths correspond to either fly-by camera views or non-user entity views.

14. The method of claim 10, further comprising:
obtaining user interaction information for individual users of the virtual space, the user interaction information for an individual user including indications of the virtual space content that the individual user has interacted with; and
wherein the narrative content in the individual sets of narrative content includes the virtual space content that the individual user has interacted with.

15. The method of claim 10, wherein the individual narrative experiences are limited by world physics of the virtual space.

16. The method of claim 10, wherein an individual event includes one or more interactions of one or more of the virtual objects with one or more other ones of the virtual objects within the one or more static environments.

17. The method of claim 10, wherein determining the individual paths is based on machine-learning.

18. The method of claim 10, wherein the virtual space is a persistent procedurally generated virtual space.

* * * * *